(12) United States Patent
Wang et al.

(10) Patent No.: US 7,479,183 B2
(45) Date of Patent: Jan. 20, 2009

(54) INK JET INK COMPOSITION

(75) Inventors: Xiaoru Wang, Webster, NY (US); David Erdtmann, Rochester, NY (US); Karen J. Klingman, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 1 day.

(21) Appl. No.: 10/446,013

(22) Filed: May 27, 2003

(65) Prior Publication Data

US 2003/0199614 A1 Oct. 23, 2003

Related U.S. Application Data

(63) Continuation-in-part of application No. 09/822,723, filed on Mar. 30, 2001, now abandoned.

(51) Int. Cl.
*C09D 11/10* (2006.01)
*C09D 11/02* (2006.01)
*C09D 11/00* (2006.01)
*C08K 9/04* (2006.01)
*C08K 9/10* (2006.01)

(52) U.S. Cl. .............. 106/31.65; 106/31.13; 106/31.6; 523/160; 523/161; 523/200; 523/215; 523/201; 524/850; 524/853

(58) Field of Classification Search .............. 523/160, 523/161, 200, 205; 106/31.6, 31.13, 31.65; 524/850, 853
See application file for complete search history.

(56) References Cited

U.S. PATENT DOCUMENTS

| 4,623,689 A | 11/1986 | Shintani et al. |
| 5,281,261 A | 1/1994 | Lin |
| 5,637,637 A | 6/1997 | Sharma et al. |
| 5,852,073 A | 12/1998 | Villiger et al. |
| 5,852,074 A | 12/1998 | Tsutsumi et al. |
| 5,958,998 A | 9/1999 | Foucher et al. |
| 5,965,634 A | 10/1999 | Idogawa et al. |
| 6,033,466 A | 3/2000 | Ito |
| 6,074,467 A | 6/2000 | Tabayashi et al. |
| 6,169,185 B1 | 1/2001 | Likavec et al. |
| 6,271,285 B1 | 8/2001 | Miyabayashi et al. |
| 6,299,941 B1 | 10/2001 | Sacripante et al. |

FOREIGN PATENT DOCUMENTS

| EP | 0 571 190 A2 | 11/1993 |
| EP | 1 006 161 A1 | 6/2000 |
| EP | 1 054 045 A1 | 11/2000 |
| WO | 01/44386 A1 | 6/2001 |
| WO | 02/16512 A1 | 2/2002 |

*Primary Examiner*—Sanza L McClendon
(74) *Attorney, Agent, or Firm*—Doreen M. Wells; Chris P. Konkol; Arthur E. Kluegel

(57) ABSTRACT

An ink jet ink composition comprising water, a humectant, and composite colorant polymer particles, wherein the composite colorant polymer particles having a colorant phase and a polymer phase, the polymer phase of the particles being formed in situ in the presence of the colorant, the composite colorant polymer particles not increasing in mean particle size more than about 50% when said ink is incubated for one week at 60° C.

14 Claims, No Drawings

INK JET INK COMPOSITION

CROSS REFERENCE TO RELATED APPLICATIONS

This is a continuation-in-part of application Ser. No. 09/822,723, filed Mar. 30, 2001 now abandoned entitled "Ink Jet Ink Composition."

Reference is made to commonly assigned, co-pending continuation-in-part application Ser. No. 10/446,059 (Publication No. 2003/0203988, published Oct. 30, 2003) by Erdtmann et al., entitled "Ink Jet Printing Method" filed simultaneously herewith.

Reference is also made to commonly assigned, co-pending application Ser. No. 09/822,724 by Erdtmann et al, filed Mar. 30, 2001 entitled "Ink Jet Printing Method"; application Ser. No. 09/822,725 by Wang et al., filed Mar. 30, 2001 entitled "Composite Colorant Particles; and U.S. Pat. No. 6,635,693 by Wang et al., issued Oct. 21, 2003, entitled "Process For Making Composite Colorant Particles" for all that they contain.

FIELD OF THE INVENTION

This invention relates to an ink jet ink composition containing composite colorant particles that have a colorant phase and a polymer phase which is very stable.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging.

In ink jet recording processes, it is necessary that the inks being used meet various performance requirements. Such performance requirements are generally more stringent than those for other liquid ink applications, such as for writing instruments (e.g., a fountain pen, felt pen, etc.). In particular, the following conditions are generally required for inks utilized in ink jet printing processes:

(1) The ink should possess physical properties such as viscosity, surface tension, and electric conductivity matching the discharging conditions of the printing apparatus, such as the driving voltage and driving frequency of a piezoelectric electric oscillator, the form and material of printhead orifices, the diameter of orifices, etc;

(2) The ink should be capable of being stored for a long period of time without causing clogging of printhead orifices during use;

(3) The ink should be quickly fixable onto recording media, such as paper, film, etc., such that the outlines of the resulting ink dots are smooth and there is minimal blotting of the dotted ink;

(4) The printed image should be of high quality, such as having a clear color tone and high density, have high gloss and high color gamut;

(5) The printed image should exhibit excellent waterfastness (water resistance) and lightfastness (light resistance);

(6) The printed (ink) images should have good adhesion to the surface of image receiving elements and should be durable and highly resistant to physical and mechanical scratches or damages (7) The ink should not chemically attack, corrode or erode surrounding materials such as the ink storage container, printhead components, orifices, etc;

(8) The ink should not have an unpleasant odor and should not be toxic or inflammable; and (9) The ink should exhibit low foaming and high pH stability characteristics.

The inks used in various ink jet printers can be classified as either dye-based or pigment-based. A dye is a colorant which is molecularly dispersed or solvated by a carrier medium. The carrier medium can be a liquid or a solid at room temperature. A commonly used carrier medium is water or a mixture of water and organic cosolvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor lightfastness. When water is used as the carrier medium, such inks also generally suffer from poor waterfastness.

Pigment-based inks have been gaining in popularity as a means of addressing these limitations. In pigment-based inks, the colorant exists as discrete particles. These pigment particles are usually treated with addenda known as dispersants or stabilizers which serve to keep the pigment particles from agglomerating and/or settling out.

Pigment-based inks suffer from a different set of deficiencies than dye-based inks. One deficiency is that pigment-based inks interact differently with specially coated papers and films, such as transparent films used for overhead projection and glossy papers and opaque white films used for high quality graphics and pictorial output. In particular, it has been observed that pigment-based inks produce imaged areas that are entirely on the surface of coated papers and films which results in images that have poor dry and wet adhesion properties and can be easily smudged. In recent years, ink jet receivers have been developed to have both high gloss and fast drying capacities. However, scratch mark smudges are more visible on high gloss receivers. There is a need to provide a pigmented ink composition that results in images on the surface of an ink jet recording element which have improved durability and smudging resistance.

Another deficiency from which pigmented inks suffer is their poor storage stability due to the presence of a water-miscible organic solvent. Water-miscible organic solvents are used to adjust ink rheology, to maximize ink firability and re-runability. These solvents prevent ink from drying in a printing head and lower ink surface tension to minimize the effect of air-entrapment in an ink formulation which would otherwise generate air bubbles which would seriously affect the head performance. However, these water-miscible organic solvents can also have a negative effect on the colloidal stability of pigment particles in an ink formulation. There is a need to provide a pigmented ink composition which would have improved storage stability in the presence of various types of water-miscible organic solvents.

U.S. Pat. No. 5,852,073 discloses an erasable ink composition which comprises a dispersion of particles of water-insoluble polymer-encapsulated colorant obtained by polymerizing under emulsion polymerization conditions in the presence of solid colorant particles. The process described is a batch or semi-batch process by which an ethylenically-unsaturated monomer and a colorant are emulsified together before being subjected to emulsion polymerization conditions. The particle dispersions prepared by such a process are a physical mixture of polymer latex particles, polymer encapsulated colorant, and water soluble polymers. However, there is a problem with these dispersions when they are formulated into an ink jet ink, in that the presence of free polymers (both polymer particles and water soluble polymers) can significantly increase ink viscosity, decrease ink storage stability, cause premature printing head failure, and generate image defects.

EP1006161 discloses a process for making an ink composition wherein polymer-coated colorant particles are prepared using a batch emulsion polymerization process employing colorant particles, monomers and an initiator. The polymer-coated colorant particles prepared by such a process are a physical mixture of polymer particles, polymer-encapsulated colorant and water-soluble polymers. However, there is a problem with these dispersions when they are formulated into an ink jet ink, in that the presence of free polymers (both polymer particles and water soluble polymers) can significantly increase ink viscosity, decrease ink storage stability, cause premature printing head failure, and generate image defects.

It is an object of this invention to provide an ink jet ink composition containing composite colorant polymer particles that have improved compatibility with water-soluble organic solvents, improved stability in an ink jet composition, and when such ink composition is printed, the resultant images on the surface of an ink jet recording element have improved image quality and physical durability such as scratch and smudging resistance.

SUMMARY OF THE INVENTION

These and other objects are achieved in accordance with this invention which relates to an ink jet ink composition comprising water, a humectant, and composite colorant polymer particles, wherein said composite colorant polymer particles have a pigment phase and a polymer phase, said polymer phase of said particles being formed in situ, wherein a portion of an addition polymerization initiator is added to an aqueous colorant mixture before adding a monomer mixture to the colorant mixture in a continuous process, said composite colorant polymer particles not increasing in mean particle size more than about 18% when said ink is incubated for one week at 60° C.

The ink jet ink composition of the invention containing the composite colorant particles has better stability than those prepared by the prior art and has good resistance to abrasion.

DETAILED DESCRIPTION OF THE INVENTION

As described above, the composite colorant polymer particles do not increase in mean particle size more than about 18% when the ink is incubated for one week at 60° C. In a preferred embodiment, the composite colorant-polymer particles do not increase in mean particle size more than about 18%, more preferably 10%, when said ink is incubated for one week at 60° C. The term, "mean particle size" means that 50% by weight of the particles have a particle size less than that number.

The composite colorant polymer particles used in this invention may be prepared by the process disclosed in the above-referred to U.S. application Ser. No. 09/822,096 by Wang et al., filed Mar. 30, 2001 entitled "Process For Making Composite Colorant Particles", the disclosure of which is hereby incorporated by reference. Another method of preparing such colorant particles is to attach a functional group to the particle surface, followed by emulsion polymerization.

In the process of the above-identified application, a portion of an addition polymerization initiator is added to an aqueous colorant mixture before introducing a monomer mixture which is used to form the polymer phase of the composite colorant particles. The aqueous colorant mixture comprises submicron colorant particles which are used to form the colorant phase of the composite particles, but no monomer which is used to form the polymer phase is added to the colorant mixture at this stage or prior to this stage. The colorant phase and the polymer phase are essentially incompatible. However there may be an interface formed between the colorant phase and polymer phase.

In a preferred embodiment of that process, the ethylenically-unsaturated monomer which may be employed comprises:

a) an ethylenically-unsaturated monomer being free of ionic charge groups and capable of addition polymerization to form a substantially water-insoluble homopolymer, and b) another ethylenically-unsaturated monomer being capable of addition polymerization to form a substantially water-soluble homopolymer;

In accordance with the above-described process, the monomer mixture is added to the colorant mixture continuously. The duration of the addition time depends on the types of monomers and reaction temperatures employed. The addition time can be shorter for more reactive monomers and at higher reaction temperatures. For monomers of low reactivity at a lower reaction temperature, a shorter monomer addition time may flood the system with free monomers which can form secondary polymer particles which comprise essentially no colorant phase. With longer addition time, the polymerization is carried out under monomer starvation conditions and almost all the monomers are consumed by the colorant particles.

In accordance with the above process, a preferred way to cause an addition polymerization initiator to form a free radical is by using heat. Depending on the types of initiators used, the reaction temperature can vary from about 30 to about 90° C. Preferably the reaction temperature is at least 40° C. and most preferably at least 50° C. To ensure that no free monomer is present, usually the reaction is continued for a longer time after the monomer addition. Also monomer may be need to be added to scavenge during the final stage of the reaction to increase the reaction conversion.

A wide variety of organic and inorganic pigments, alone or in combination, may be selected for use in the present invention. Colorant particles which may be used in the invention include pigments as disclosed, for example in U.S. Pat. Nos. 5,026,427; 5,086,698; 5,141,556; 5,160,370; and 5,169,436, the disclosures of which are hereby incorporated by reference. The exact choice of pigments will depend upon the specific application and performance requirements such as color reproduction and image stability. Pigments suitable for use in the present invention include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Violet 1, 2, 3, 5:1, 13, 19, 23, 25, 27,29, 31, 32, 37, 39,42,44, 50; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C.I. Pigment Green 1, 2, 4, 7, 8, 10, 36, 45; C.I. Pigment Black 1, 7, 20, 31, 32, and C.I. Pigment Brown 1, 5, 22, 23, 25, 38, 41, 42. In a preferred embodiment of the invention, the pigment set is cyan pigment, C.I. Pigment Blue 15:3; quinacridone magenta, C.I. Pigment Red 122; C.I. Pigment Yellow 155; and carbon black, C.I. Pigment Black 7.

The colorant particles employed in the present invention can employ water-soluble or water-insoluble dyes. Examples of water-soluble dyes which may be used include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company. Examples of water-insoluble dyes which may be used include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow.

The composite colorant particles useful in the invention may have any particle size which can be jetted through a print head. Preferably, the composite colorant particles have a mean particle size of less than about 200 nm, more preferably less than about 80 nm.

Various processes known in the art can be used in the invention to form a suspension of a colorant particle in an aqueous medium. The suspensions are primarily composed of colorant particles, dispersants/surfactants, and water. The dispersants can be nonionic, anionic, cationic, and/or polymeric and can be used at levels as high as 50% of the colorant particles.

Colorant particles useful in the invention can be formed by various methods known in the art. For example, they can be prepared by pulverizing and classifying dry pigments or by spray drying of a solution containing dyes followed by redipsersing the resultant particles in water using a dispersant. They can be prepared by a suspension technique which includes dissolving a dye in, for example, a water-immiscible solvent, dispersing the solution as fine liquid droplets in an aqueous solution, and removing the solvent by evaporation or other suitable techniques. They can also be prepared by mechanically grinding a pigment material in water to a desired particle size in the presence a dispersant.

Addition polymerization initiators useful in the above-described process include, for examples, an azo and diazo compounds, such as 2,2'-azobisisobutyronitrile, 2,2'-azobis(2,4-dimethyl valeronitrile), 2,2'-azobis(2,3-dimethyl butyronitrile), 2,2'-azobis(2-methyl butyronitrile), 2,2'-azobis(2,3,3-trimethyl butyronitrile), 2,2'-azobis(2-isopropyl butyronitrile), 1,1'-azobis (cyclohexane-1-carbonitrile), 2,2'-azobis(4-methoxyl-2,4-dimethyl valeronitrile), 2-(carbamoylazo)isobutyronitrile, 4,4'-azobis(4-cyanovaleric acid), and dimethyl-2,2' azobis isobutyrate, or peroxide compounds, such as butyl peroxide, propyl peroxide, butyryl peroxide, benzoyl isobutyryl peroxide, and benzoyl peroxide, or water soluble initiators, for example, sodium persulfate, and potassium persulfate, or any redox initiators. The initiators may be used in an amount varying from about 0.2 to 3 or 4 weight percent or higher by weight of the total monomers. Usually, a higher initiator concentration results in lower molecular weights of the final polymers. In general, if the colorant is an organic pigment, then good results have been obtained using either an oil-soluble initiator or a water-soluble initiator. If the colorant is an inorganic pigment, such as carbon black, then good results can be obtained using a water-soluble initiator.

Surfactants that can be used in the above-described process include, for example, a sulfate, a sulfonate, a cationic compound, a reactive surfactant, an amphoteric compound, and a polymeric protective colloid. Specific examples are described in "McCutcheon's Emulsifiers and Detergents: 1995, North American Editor". A chain transfer agent such as butyl mercaptan, may also be used to control the properties of the polymer formed.

The ethylenically-unsaturated monomers which can be used in the above-described process include, for example, the following monomers and their mixtures: acrylic acid, methacrylic acid, ethacrylic acid, methyl acrylate, ethyl acrylate, ethyl methacrylate, benzyl acrylate, benzyl methacrylate, propyl acrylate, propyl methacrylate, iso-propyl acrylate, iso-propyl methacrylate, butyl acrylate, butyl methacrylate, hexyl acrylate, hexyl methacrylate, octadecyl methacrylate, octadecyl acrylate, lauryl methacrylate, lauryl acrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, phenethylacrylate, phenethyl methacrylate, 6-phenylhexyl acrylate, 6-phenylhexyl methacrylate, phenyllauryl acrylate, phenyllaurylmethacrylate, 3-nitrophenyl-6-hexyl methacrylate, 3-nitrophenyl-18-octadecyl acrylate, ethyleneglycol dicyclopentyl ether acrylate, vinyl ethyl ketone, vinyl propyl ketone, vinyl hexyl ketone, vinyl octyl ketone, vinyl butyl ketone, cyclohexyl acrylate,3-methacryloxypropyl-dimethylmethoxysilane, 3-methacryloxypropyl-methyldimethoxysilane,3-methacryloxypropyl -pentamethyldisiloxane, 3-methacryloxypropyltris-(trimethylsiloxy)silane,3-acryloxypropyl-dimethylmethoxysilane, acryloxypropylmethyldimethoxysilane, trifluoromethyl styrene, trifluoromethyl acrylate, trifluoromethyl methacrylate, tetrafluoropropyl acrylate, tetrafluoropropyl methacrylate, heptafluorobutyl methacrylate, isobutyl acrylate, isobutyl methacrylate, 2-ethylhexyl acrylate, 2-ethylhexyl methacrylate, isooctyl acrylate, isooctyl methacrylate, ,N-dihexyl acrylamide, N,N-dioctyl acrylamide, N,N-dimethylaminoethyl acrylate, N,N -dimethylaminoethyl methacrylate, N,N-diethylaminoethyl acrylate, N,N-diethylaminoethyl methacrylate, piperidino-N-ethyl acrylate, vinyl propionate, vinyl acetate, vinyl butyrate, vinyl butyl ether, and vinyl propyl ether ethylene, styrene, vinyl carbazole, vinyl naphthalene, vinyl anthracene, vinyl pyrene, methyl methacrylate, methyl acrylate, alpha-methylstyrene, dimethylstyrene, methylstyrene, vinylbiphenyl, glycidyl acrylate, glycidyl methacrylate, glycidyl propylene, 2-methyl-2-vinyl oxirane, vinyl pyridine, aminoethyl methacrylate, aminoethylphenyl acrylate, maleimide, N-phenyl maleimide, N-hexyl maleimide, N-vinyl-phthalimide, and N-vinyl maleimide poly(ethylene glycol) methyl ether acrylate, polyvinyl alcohol, vinyl pyrrolidone, vinyl 4-methylpyrrolidone, vinyl 4-phenylpyrrolidone, vinyl imidazole, vinyl 4-methylimidazole, vinyl 4-phenylimidazole, acrylamide, methacrylamide, N,N-dimethyl acrylamide, N-methyl acrylamide, N-methyl methacrylamide, aryloxy dimethyl acrylamide, N-methyl acrylamide, N-methyl methacrylamide, aryloxy piperidine, and N,N-dimethyl acrylamide acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropanetriethylammonium chloride, methacrylamidopropanetriethylammonium chloride, vinyl-pyridine hydrochloride, sodium vinyl phosphonate and sodium 1-methylvinylphosphonate, sodium vinyl sulfonate, sodium 1-methylvinyl-sulfonate, sodium styrenesulfonate, sodium acrylamidopropanesulfonate, sodium methacrylamidopropanesulfonate, and sodium vinyl morpholine sulfonate, allyl methacrylate, allyl acrylate, butenyl acrylate, undecenyl acrylate, undecenyl methacrylate, vinyl acrylate, and vinyl methacrylate; dienes such as butadiene and isoprene; esters of saturated glycols or diols with unsaturated monocarboxylic acids, such as, ethylene glycol diacrylate, ethylene glycol dimethacrylate, triethylene glycol dimethacrylate, 1,4-butanediol dimethacrylate, 1,3-butanediol dimethacrylate, pentaerythritol tetraacrylate, trimethylol propane trimethacrylate and polyfunctional aromatic compounds such as divinylbenzene and the like.

As was noted above, the term "composite" means that the colorant particles prepared by the above-described process comprise at least two physical phases. The phase domains are not separated apart from each other and there are bonds or interfaces between them.

In forming an ink jet ink, it is desirable to make the composite colorant particles in the form of a concentrate. The concentrate is then diluted with an appropriate solvent to a concentration best for viscosity, color, hue, saturation density, and print area coverage for the particular application. Acceptable viscosities for such inks, as determined using a Brookfield apparatus and related methods, are generally not greater than 20 centipoise, and are preferably in the range of about 1 to 15 centipoise.

The composite colorant particles used in the invention can comprise up to about 30% by weight of an ink jet ink composition, and preferably from about 0.05 to 15 wt. %. Co-solvents or a humectant can also be added to the ink composition to help prevent the ink from drying out or crusting in the orifices of the printhead. Classes of co-solvents and humectants which may be employed include, but are not limited to, monohydric alcohols with carbon chains greater than about 10 carbon atoms such as decanol, dodecanol, oleoyl alcohol, stearoyl alcohol, hexadecanol, eicosanol, polyhydric alcohols, such as ethylene glycol, alcohol, diethylene glycol (DEG), triethylene glycol, propylene glycol, tetraethylene glycol, polyethylene glycol, glycerol, 2-methyl-2,4-pentanediol, 2-ethyl-2-hydroxymethyl-1,3-propanediol (EHMP), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, poly(ethylene glycol) monobutyl ether (PEGMBE), and diethylene glycol monobutylether(DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone.

In an ink jet ink, the polymer phase composition can be selected to maximize the compatibility of the composite particles with the organic solvent used in the formulation, and to maximize the interaction with the substrate where the ink is applied. The maximized compatibility with the organic solvent produces long term storage stability, and the maximized interaction with the substrate improves the adhesion or smudge resistance of the image area.

A biocide may be added to an ink jet ink composition to suppress the growth of micro-organisms such as molds, fungi, etc. in aqueous inks. A preferred biocide for an ink composition is Proxel® GXL (Zeneca Specialties Co.) at a final concentration of 0.0001-0.5 wt. %. Additional additives which may optionally be present in an ink jet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

Ink jet inks made using composite colorant particles of this invention are employed in ink jet printing wherein liquid ink drops are applied in a controlled fashion to an ink receptive substrate, by ejecting ink droplets from plurality of nozzles, or orifices, in a print head of ink jet printers.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks using composite colorant particles can be employed in ink jet printing wherein liquid ink drops are applied in a controlled fashion to an ink receptive layer substrate, by ejecting ink droplets from the plurality of nozzles, or orifices, in a print head of ink jet printers Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples illustrate the utility of the present invention.

EXAMPLES

The following pigment dispersions were prepared:

Black Pigment Dispersion

| | |
|---|---|
| Mill Grind | 325.0 g |
| Polymeric beads, mean diameter of 50 micron (milling media) | |
| Black Pearls 880 (Pigment Black) from Cabot Chemical Company | 30 g |
| Oleoyl methyl tuarine, (OMT) potassium salt | 10.5 g |
| Deionized water | 209.5 g |
| Proxel GXL ® (biocide from Zeneca) | 0.2 g |

The above components were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4-8 μm KIMAX® Buchner Funnel obtained from VWR Scientific Products.

Magenta Pigment Dispersion

This dispersion was prepared the same as the black pigment dispersion except that Pigment Red 122 (Sunfast Quinacridone Pigment obtained from Sun Chemical Corporation) was used instead of the black pigment.

Yellow Pigment Dispersion

This dispersion was prepared the same as the black pigment dispersion except that Pigment Yellow 155 (Clariant Corp.) was used instead of the black pigment.

Cyan Pigment Dispersion

This dispersion was prepared the same as the black pigment dispersion except that Pigment Blue 15:3, (Sun Chemical Co.) was used instead of the black pigment.

Preparation of Composite Colorant Particle Dispersions

Composite Colorant Particle Dispersion 1 (Invention)

A stirred reactor containing 60 g of the magenta dispersion was heated to 85° C. and purged with $N_2$ for 2 hour. 0.03 g of initiator azobisisobutyronitrile (AIBN) in 1 gram of toluene was then added to the reactor. An emulsion containing 30 g of deionized water, 0.5 g of sodium dodecyl sulfonate surfactant, 0.03 g of initiator, AIBN, 4.5 g of methyl methacrylate, 1.2 g of methacrylic acid, and 0.3 g of divinyl benzene was added continuously for 2 hours. The reaction was allowed to continue for 4 more hours before the reactor was cooled down to room temperature. The composite colorant particles dispersed in water (composite colorant particle dispersion) were then filtered through glass fibers to remove any coagulum. The particles made contain about 50% by weight of a colorant phase and about 50% by weight of a polymer phase. The composite colorant particle dispersion produced is designated as Composite Colorant Particle Dispersion 1.

Composite Colorant Particle Dispersions 2-21 (Invention)

Composite Colorant Particle Dispersions 2 to 21 were prepared in a similar manner to Composite Colorant Particle Dispersion 1 except as follows: Composite Colorant Particle Dispersions 2 to 15 contained polymers having the compositions as listed in Table 1; Composite Colorant Particle Dispersions 16 and 17 used the Black Pigment Dispersion as the colorant phase, the polymers as listed in Table 1 and the initiator was sodium persulfate (NaPS); Composite Colorant Particle Dispersions 18 and 19 used the Yellow Pigment Dispersion and the polymers as listed in Table 1; and Composite Colorant Particle Dispersions 20 and 21 used the Cyan Pigment Dispersion and the polymers as listed in Table 1. The particle size was measured by a Microtrac Ultra Fine Particle Analyzer (Leeds and Northrup) at a 50% median value. These results are also in Table 1:

TABLE 1

| Composite Colorant Particle Dispersion | Polymer Composition* (wt. ratios) | Initiator | Particle Size (nm) |
|---|---|---|---|
| 1 | MMA/MAA/DVB (75/20/5) | AIBN | 13 |
| 2 | MMA/MAA/EGDM (90/5/5) | AIBN | 13 |
| 3 | MMA/EHMA/MAA (20/60/20) | AIBN | 14 |
| 4 | S/BMA/MAA (25/60/15) | AIBN | 14 |
| 5 | MMA/EA/MAA (45/40/15) | AIBN | 13 |
| 6 | MMA/EHMA/MAA (20/65/15) | AIBN | 14 |
| 7 | MMA/MAA/EGDM (80/15/5) | AIBN | 13 |
| 8 | MMA/MAA/EGDM (75/20/5) | AIBN | 14 |
| 9 | MMA/MAA/DVB (70/20/10) | AIBN | 13 |
| 10 | S/BMA/MAA (45/40/15) | AIBN | 13 |
| 11 | S/MAA/DVB (75/20/5) | AIBN | 13 |
| 12 | S/BMA/MAA/EGDM (20/60/15/5) | AIBN | 14 |
| 13 | S/BMA/MAA/DVB (20/60/15/5) | AIBN | 14 |
| 14 | EMA/MAA/EGDM (75/20/5) | AIBN | 14 |
| 15 | MMA/VP/EGDM (80/15/5) | AIBN | 13 |
| 16 | MMA/MAA/DVB (75/20/5) | NaPS | 49 |
| 17 | S/BMA/MAA (25/60/15) | NaPS | 53 |
| 18 | MMA/MAA/DVB (75/20/5) | AIBN | 12 |
| 19 | S/BMA/MAA (25/60/15) | AIBN | 13 |
| 20 | MMA/MAA/DVB (75/20/5) | AIBN | 39 |
| 21 | S/BMA/MAA (25/60/15) | AIBN | 41 |

*MMA: methyl methacrylate
VP: N-vinyl pyrrolidone
MAA: methacrylic acid
EHMA: ethylhexyl methacrylate
BMA: butyl methacrylate
EA: ethyl acrylate
EGDM: ethylene glycol dimethacrylate
DVB: divinyl benzene
S: styrene
EMA: ethyl methacrylate Comparative Colorant Particle Dispersion C-1

A stirred reactor containing 60 g of Pigment Red 122 magenta dispersion as prepared in Example 1 was heated to 80° C. and purged with $N_2$ for 2 hours. A monomer emulsion mixture containing 30 g of deionized water, 0.5 g of sodium dodecyl sulfonate surfactant, 0.06 g of an initiator, AIBN, 4.5 g of methyl methacrylate, 1.2 g of methacrylic acid, and 0.3 g of divinyl benzene was added continuously for 2 hours. The reaction was allowed to continue for 4 more hours before the reactor was cooled down to room temperature. The composite colorant particle dispersion prepared was filtered to remove any coagulum. The particles made contain about 50% by weight of a colorant phase and about 50% by weight of a polymer phase.

The procedure used to prepare Comparative Colorant Particle Dispersion C-1 is similar to the same one used to prepare Composite Colorant Particle Dispersion 1 (Invention) except that no addition polymerization initiator was added to the reactor before the addition of the monomer emulsion mixture.

Comparative Colorant Particle Dispersion C-2 (E. P. 1,006, 161)

A stirred reactor containing 60 g of the Black Pigment Dispersion, 0.06 g of potassium persulfate, 30 g of water, 4.5 g of methyl methacrylate, 1.2 g of methacrylic acid, 0.3 g of divinyl benzene and 0.5 g of sodium dodecyl sulfonate was heated to 80° C. in a nitrogen atmosphere. The reactor was kept at 80° C. for more than 4 hours and then cooled down. The final product prepared was filtered to remove any coagulum. This preparation is different from the invention process in that it is a batch emulsion polymerization process, by which the polymerizable monomers, colorant, and initiator were mixed together before being subjected to emulsion polymerization conditions.

Ink Preparation

The above prepared dispersions were used to prepare inks 1-21, which contained Composite Colorant Particle Dispersions 1-21, 22 which contained the Black Pigment Dispersion, 23 which contained the Magenta Pigment Dispersion, 24 which contained the Yellow Pigment Dispersion, 25 which contained the Cyan Pigment Dispersion, 26 which contained Comparative Colorant Dispersion C-1, and 27 which contained Comparative Colorant Dispersion C-2.

A typical ink formulation comprises, in addition to the colorant dispersion, 2.5 wt. % of Dowanol® DPM, 23 wt. % of triethylene glycol, 10 wt. % glycerol, and 0.2 wt. % of Strodex® PK-90. The final ink pH was adjusted to 8.5 using triethanol amine. The concentration of colorant in the ink is about 2.5 wt. %. (this being the colorant phase of the composite colorant particles prepared above).

Ink Characterization

Storage Stability of Ink:

The inks were placed in a sample bottle made of glass and allowed to stand at 60° C. for up to one week. At the end of the week, the particle size was measured as described above.

If the mean particle size of the ink measured by UPA has growth less than 10% between the fresh ink and the ink after one week, the ink storage stability was defined as "excellent"; growth from 10% to 18% was defined as "good"; growth from more than 18 to 50% was defined as "poor"; and growth more than 50% was defined as "very poor". The results are listed in Table 2 below.

Finger Dry and Wet Rubbing Resistance:

The inks were coated onto the following ink jet receiver substrates: Epson Premium Gloss, Konica QP, and Kodak Photographic InkJet Paper. After coating, the ink was allowed to dry for 10 minutes. The apparently dried ink was then immediately tested for dry rubbing resistance and wet rubbing resistance. For dry finger rubbing resistance, the ink was rubbed with a dry finger. For wet finger rubbing resistance, a drop of water was placed on the dried ink area before performing the finger-rubbing test.

The rubbing resistance was evaluated in terms of a color change. The rubbing resistance is rated "excellent" if no visible color change was observed, "good" if slight color change was observed, and "poor" if significant color change was observed. The following results were obtained:

TABLE 2

| Ink | Storage stability | Dry rub-test | Wet rub-test |
| --- | --- | --- | --- |
| 1 | excellent | excellent | excellent |
| 2 | excellent | excellent | excellent |
| 3 | good | excellent | excellent |
| 4 | excellent | excellent | excellent |
| 5 | good | good | good |
| 6 | excellent | excellent | excellent |
| 7 | excellent | excellent | excellent |
| 8 | excellent | excellent | excellent |
| 9 | good | excellent | excellent |
| 10 | excellent | excellent | excellent |
| 11 | excellent | excellent | excellent |
| 12 | excellent | excellent | excellent |
| 13 | excellent | excellent | excellent |
| 14 | good | good | good |
| 15 | good | good | good |
| 16 | excellent | excellent | excellent |

TABLE 2-continued

| Ink | Storage stability | Dry rub-test | Wet rub-test |
| --- | --- | --- | --- |
| 17 | excellent | excellent | excellent |
| 18 | excellent | excellent | excellent |
| 19 | excellent | excellent | excellent |
| 20 | excellent | excellent | excellent |
| 21 | excellent | excellent | excellent |
| 22 (Black) | excellent | poor | poor |
| 23 (Magenta) | excellent | poor | poor |
| 24 (Yellow) | excellent | poor | poor |
| 25 (Cyan) | excellent | poor | poor |
| 26 (C-1) | poor | good | good |
| 27 (C-2) | very poor | good | good |

*polymer composition identified in Table 1

The above results show that an ink formulated from particles in accordance with the invention has good stability and has good or excellent resistance to abrasion, as compared to inks using particles prepared by prior art methods.

Printing Test

The above-prepared inks which had good storage stability were filled into disposable Epson 440 color and black ink cartridges and loaded into an Epson 440 ink jet printer. Images were printed onto the ink jet receiver substrates listed above. The image quality was acceptable. The finger dry rub test and wet rub test for the inks were evaluated as above. The results are summarized in Table 3.

TABLE 3

| Ink | Dry rub-test | Wet rub-test |
| --- | --- | --- |
| 1 | excellent | excellent |
| 2 | excellent | excellent |
| 3 | excellent | excellent |
| 4 | excellent | excellent |
| 5 | good | good |
| 6 | excellent | excellent |
| 7 | excellent | excellent |
| 8 | excellent | excellent |
| 9 | excellent | excellent |
| 10 | excellent | excellent |
| 11 | excellent | excellent |
| 12 | excellent | excellent |
| 13 | excellent | excellent |
| 14 | good | good |
| 15 | good | good |
| 16 | excellent | excellent |
| 17 | excellent | excellent |
| 18 | excellent | excellent |
| 19 | excellent | excellent |
| 20 | excellent | excellent |
| 21 | excellent | excellent |
| 22 (Black) | poor | poor |
| 23 (Magenta) | poor | poor |
| 24 (Yellow) | poor | poor |
| 25 (Cyan) | poor | poor |

The above results show that an ink formulated from particles in accordance with the invention has good or excellent resistance to abrasion, as compared to inks using particles prepared by prior art methods.

The invention has been described in detail with particular reference to certain preferred embodiments thereof, but it will be understood that variations and modifications can be effected within the spirit and scope of the invention.

What is claimed is:

1. An ink jet ink composition comprising water, a humectant, and composite pigment polymer particles, wherein said composite pigment polymer particles have a pigment phase and a polymer phase, said polymer phase comprising a polymer formed from
  a) an ethylenically-unsaturated monomer free of ionic charge groups and capable of addition polymerization to form a substantially water-insoluble homopolymer, and
  b) another ethylenically-unsaturated monomer capable of addition polymerization to form a substantially water-soluble homopolymer;

said particles being formed in situ, wherein a portion of an addition polymerization initiator is added to an aqueous pigment mixture, wherein said aqueous pigment mixture contains no monomer which is used to form the polymer phase, and then adding a monomer mixture of subparagraphs a) and b) for forming the polymer phase to the pigment mixture in a continuous process the ink jet ink composition being stable as defined by said composite pigment polymer particles not increasing in mean particle size more than about 18% when said ink jet ink composition is incubated for one week at 60° C., wherein said composite pigment polymer particles have a mean particle size of less than about 80 nm and wherein the ratio of said pigment phase to said polymer phase is from about 30:70 to about 70:30.

2. The composition of claim 1 wherein said composite pigment polymer particles are made by a process comprising, in order:
  I) suspending in an aqueous medium, under agitation, finely divided pigment particles to form an aqueous pigment mixture;
  II) adding to said aqueous pigment mixture the first portion of the addition polymerization initiator in the absence of monomers a) and b); and
  III) causing said addition polymerization initiator to form a free radical while continuously introducing to said aqueous pigment mixture a monomer mixture comprising:
    a) an addition polymerization initiator, and
    b) the monomer mixture of subparagraphs a) and b) of claim 1;
  thereby forming said composite pigment particles having a pigment phase and a polymer phase.

3. The composition of claim 1 wherein said pigment is C.I. Pigment Blue 15:3, C.I. Pigment Red 122, C.I. Pigment Yellow 155 or C.l. Pigment Black 7.

4. The composition of claim 1 wherein the composite pigment particles comprise up to about 20% by weight of said composition.

5. The composition of claim 1 wherein the composite pigment particles comprise up to about 10% by weight of said composition.

6. The composition of claim 1 wherein said humectant comprises from about 5 to about 60% by weight of said composition.

7. The composition of claim 1 wherein said humectant comprises from about 10 to about 50% by weight of said composition.

8. The composition of claim 1 wherein said polymer phase comprises a polymer formed from methyl methacrylate, ethyl methacrylate, butyl methacrylate, ethyl acrylate, butyl acrylate, hexyl acrylate, n-octyl acrylate, lauryl methacrylate, 2-ethyilhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, t-butyl styrene, vinyl toluene, butadiene, isoprene, N,N-dimethyl acrylamide, acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropane-triethylammonium chloride, methacrylamidopropane-triethylammonium chloride, vinylpyridine hydrochloride, sodium vinyl phosphonate or sodium 1-methylvinylphosphonate.

9. The composition of claim 1 wherein said composite pigment polymer particles do not increase in mean particle size more than about 10% when said ink is incubated for one week at 60° C.

10. An ink jet ink composition comprising water, a humectant, and composite pigment polymer particles, wherein said composite pigment polymer particles have a pigment phase and a polymer phase, said polymer phase of said particles being formed in situ, wherein a portion of an addition polymerization initiator is added to an aqueous pigment mixture wherein no monomer which is used to form the polymer phase is added to the pigment mixture prior to or at the time that a portion of an addition polymerization initiator is first added to the aqueous pigment mixture, and then adding a monomer mixture for forming the polymer phase to the pigment mixture and wherein said aqueous pigment mixture consists essentially of pigment particles, dispersants or surfactants, and water; the ink jet ink composition being stable as defined by said composite pigment polymer particles not increasing in mean particle size more than about 18% when said ink jet ink composition is incubated for one week at 60° C., wherein said composite pigment polymer particles have a mean particle size of less than about 80 nm and wherein the ratio of said pigment phase to said polymer phase is from about 30:70 to about 70:30.

11. An ink jet ink composition comprising water, a humectant, and composite pigment polymer particles, wherein said composite pigment polymer particles have a pigment phase and a polymer phase, said polymer phase of said particles being formed in situ, wherein a first portion of an addition polymerization initiator is added to an aqueous pigment mixture, wherein said aqueous pigment mixture contains no monomer which is used to form the polymer phase followed by adding a monomer mixture for forming the polymer phase to the pigment mixture; the ink jet ink composition being stable as defined by said composite pigment polymer particles not increasing in mean particle size more than about 18% when said ink is incubated for one week at 60° C., wherein said composite pigment polymer particles are made by a process comprising in order:
  I) suspending in an aqueous medium, under agitation, finely divided pigment particles to form an aqueous pigment mixture;
  II) adding to said aqueous pigment mixture the first portion of the addition polymerization initiator; and
  III) causing said addition polymerization initiator to form a free radical while continuously introducing to said aqueous pigment mixture a monomer mixture comprising:
    a) an addition polymerization initiator, and
    b) at least one ethylenically-unsaturated monomer;
  thereby forming said composite pigment particles having a pigment phase and a polymer phase, wherein said composite pigment polymer particles have a mean particle size of less than about 80 nm and wherein the ratio of said pigment phase to said polymer phase is from about 30:70 to about 70:30.

12. The composition of claim 1 wherein said polymer phase is crosslinked.

13. The composition of claim 1 wherein the initiator is an oil-soluble initiator.

14. The composition of claim 1 wherein the monomer mixture comprises up to 20% of the monomer of subparagraph b).

* * * * *